United States Patent [19]
Morimoto

[11] 4,279,387
[45] Jul. 21, 1981

[54] BAIL LATCHING AND RELEASING MECHANISM FOR SPINNING REEL

[75] Inventor: Yoshinori Morimoto, Fuchu, Japan
[73] Assignee: Ryobi Ltd., Fuchu, Japan
[21] Appl. No.: 101,039
[22] Filed: Dec. 6, 1979

[30] Foreign Application Priority Data

Dec. 18, 1978 [JP] Japan .......................... 53-174561[U]
Dec. 18, 1978 [JP] Japan .......................... 53-174562[U]

[51] Int. Cl.³ ............................................. A01K 89/01
[52] U.S. Cl. ............................................. 242/84.2 G
[58] Field of Search .................. 242/84.21 R, 84.2 G, 242/84.2 R

[56] References Cited

U.S. PATENT DOCUMENTS

| | | | |
|---|---|---|---|
| 2,942,798 | 6/1960 | Alinari | 242/84.2 G |
| 3,045,942 | 7/1962 | Henze | 242/84.21 R |
| 4,162,048 | 7/1979 | Sazaki | 242/84.21 R |

*Primary Examiner*—Billy S. Taylor
*Attorney, Agent, or Firm*—Sughrue, Rothwell, Mion, Zinn and Macpeak

[57] ABSTRACT

A bail latching and releasing mechanism is disclosed, wherein the mechanism is assembled in either one of the support housings, one being provided with a pivotable bail arm cam and the other being provided with a bail arm lever. The mechanism includes a kick lever, a dead point spring and an operation cam. The kick lever is pivotably secured to one of the support housings and is spring biased by the dead point spring to perform selective pivotal movement in synchronism with the rotation of the bail arm lever or bail arm cam. The pivotal movement is also initiated by the operation cam when the kick lever is brought into alignment with the operation cam during fishing line release position of the bail arm.

9 Claims, 16 Drawing Figures

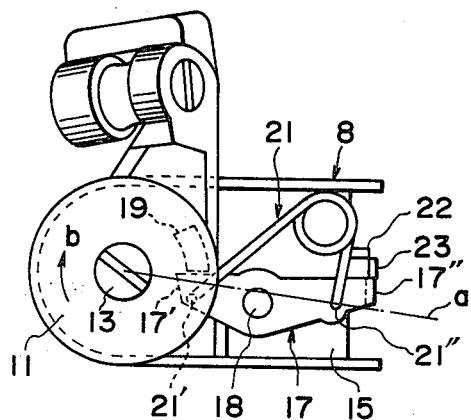
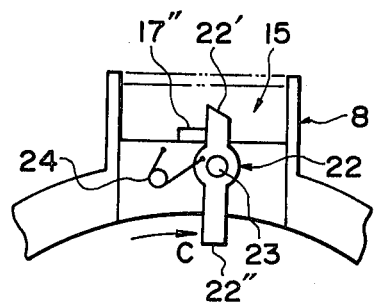
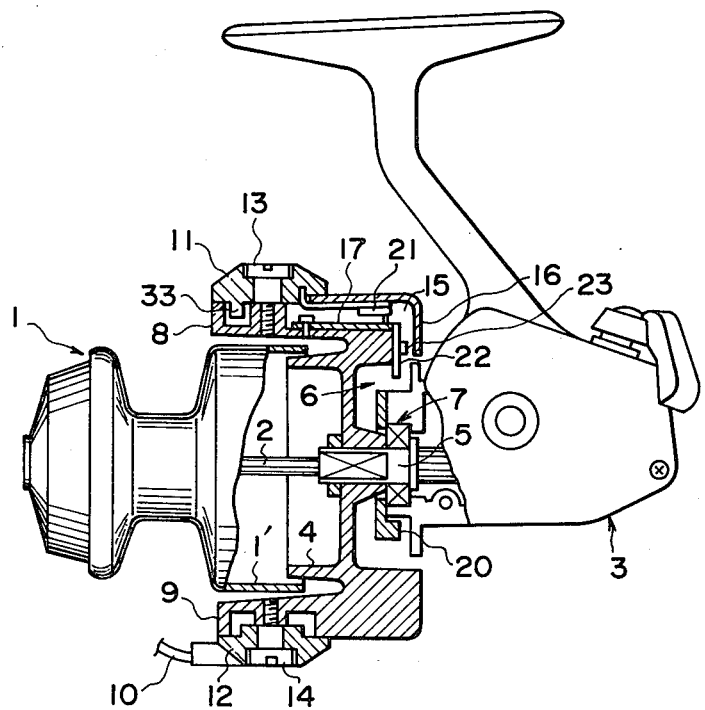

BAIL LATCHING AND RELEASING MECHANISM FOR SPINNING REEL

BACKGROUND OF THE INVENTION

This invention relates to a bail latching and releasing mechanism for an arm spool type of a spinning reel.

In this type of spinning reel, bail latching and releasing action is necessiated to release and rewind the fishing line. The bail arm is manually shifted to its fishing line releasing position, and the bail arm can be automatically returned to its fishing line rewinding position by the internal kicking action upon rotation of a rotor.

The prior art bail control mechanisms are generally characterized by a number of exposed and protruding parts of sharp and irregular shape, and therefore it would be rather difficult to assemble these complicated mechanical parts, and the production cost be rather high.

Further, a balancing weight should be accommodated in the reel in order to provide well-balanced fishing operation, so that the resultant reel becomes heavy and bulky, which in turn, degrades fisherman's interest or preference.

SUMMARY OF THE INVENTION

It is therefore an object of this invention to overcome the above-mentioned drawbacks and disadvantages and to provide an improved spinning reel having an improved bail latching and releasing mechanism.

These and other objects are attained in accordance with the present invention by providing a compact bail latching and releasing mechanism in either one of support housings. One of the support housings pivotally mounts a bail arm cam and the other support housing pivotally mounts bail arm lever. The compact bail latching and releasing mechanism includes a pivotable kick lever having one end shiftable by a stationary operation cam during rotation of the roter when the bail arm is maintained in its fishing line releasing position, while when the bail arm is maintained in its fishing line rewinding position, the kick lever is positioned at the position offset from the operation cam. Further, a dead point spring is provided having one end connected to either a bail arm cam or a bail arm lever and the other end connected to the kick lever. The dead point spring urges the cam or lever to selectively rotate toward opposite direction in response to the pivotal movement of the kick lever to thus selectively maintain the bail arm in its fishing line releasing or rewinding position.

These and other objects of this invention will become apparent from the description of the drawings and the preferred embodiments which follow.

BRIEF DESCRIPTION OF THE DRAWINGS

In the drawings:

FIGS. 7(a) and 7(b) show a bail latching and releasing mechanism according to the third embodiment of this invention, wherein the bail arm is at fishing line releasing position;

FIG. 8 is a fragmentary cross-sectional view according to a fourth embodiment of this invention;

DETAILED DESCRIPTION OF THE PREFERRED EMBODIMENTS

Figure 1:
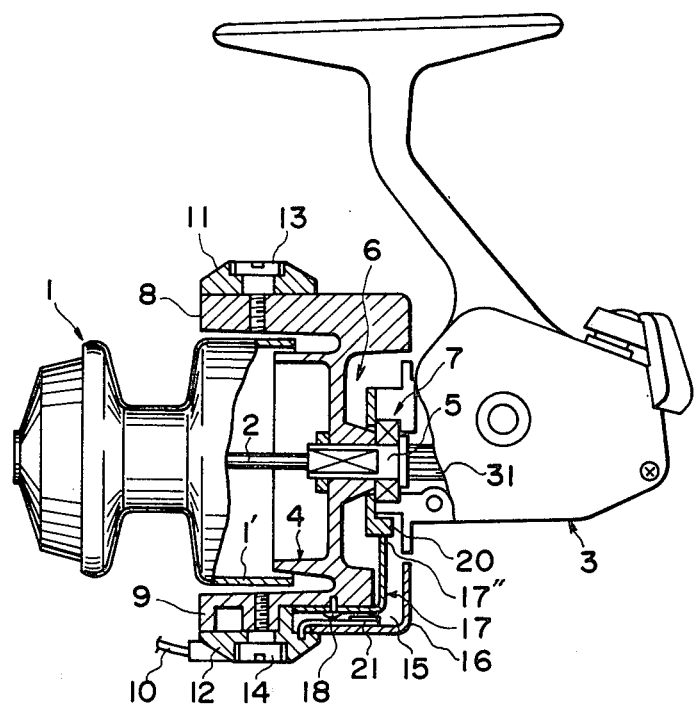
FIG. 1 is a fragmentary cross-sectional view according to a first embodiment of this invention.
Figure 2A:
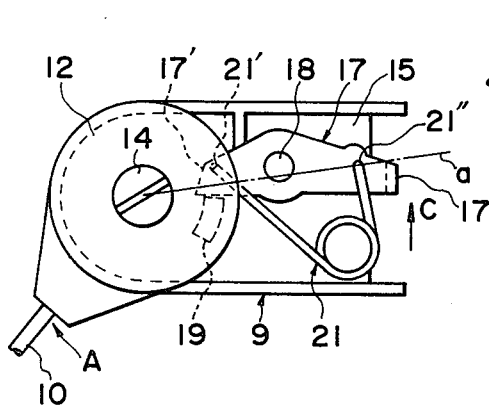
FIGS. 2(a) and 2(b) show plan views of a bail latching and releasing mechanism according to the first embodiment of this invention.
Figure 2B:
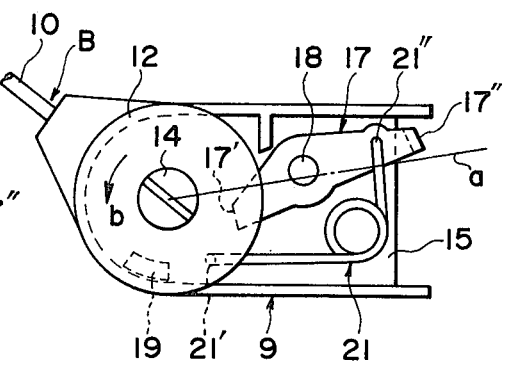

A first embodiment according to this invention is shown in FIG. 1, FIGS. 2(a) and 2(b), wherein a pair of support housings 8 and 9 are symmetrically disposed on diametrically opposite side of a rotor 4 which is mounted through a bearing 7 on a tubular shaft 5 to a reel body 3. The shaft 5 has a pinion 31 at one end and is rotated by a handle (not shown) coupled thereto by a main gear (not shown). A spool 1 is detachably supported by a main shaft 2 inserted into the tubular shaft 5. The main shaft 2 is reciprocable by a reciprocating mechanism (not shown) in synchronism with the main gear to reciprocate the spool 1. One end of a bail arm 10 is coupled to a bail arm lever 11 and the other end thereof is coupled to a bail arm cam 12. Both the bail arm lever 11 and the bail arm cam 12 are pivotally mounted on respective support housings 8, 9 by shouldered step screws 13, 14. The rotor 15 is rotationary positioned within a cylindrical portion 1 of the spool 1. Further the bearing 7 is positioned in a cylindrical recessed portion 6 formed at the rear portion of the rotor 4. Such construction is well known in the art.

According to the first embodiment, a bail latching and releasing mechanism is accommodated in one of the support housing 9 which mounts the bail arm cam 12. FIGS. 2(a) and 2(b) show fishing line release and rewind states of the bail latching and releasing mechanism, respectively. The support housing 9 is formed with a recessed portion 9 having a rear end opened to the cylindrical recess 6 as shown in FIG. 1. Further an opening of the recessed portion 9 is covered with a lid member 1b. A central portion of a L-shaped kick lever 17 is pivotally secured to a pivot shaft 18 extending from a bottom surface of the recessed portion 15. One end 17' of the L-shaped kick lever 17 is adapted to abut on a boss 19 upstanding from the bail arm cam 12 in order to maintain fishing line release state of the bail arm 10. The other end 17" of the kick lever 17 is oriented in the cylindrical recess 6 inwardly along the radial direction of the rotor 4 in order to be brought into contact with a stationary operation cam 20 secured to the bearing 7 or to the reel body 3 at the position adjacent to the bearing 7 when the rotor (support housing 9) is rotated.

Further, within the recessed portion 15, a dead-point spring 21 is secured having one end 21' connected to the bail arm cam 12 and the other end 21" connected to the kick lever 17 at its position near the operation cam 20. The dead point of the dead-point-spring is determined as shown by a dotted chain line "a." That is, when the ends 21', 21" of the dead-point-spring 21 are on the line "a," the spring 21 is at the dead point and if at least one of the ends is displaced from the line "a," the spring 21 is inherently moved to shorten the distance between ends 21' and 21" or to enlarge the distance because of its resiliency.

With this structure, the kick lever 17 is secured as shown in FIG. 2(b) when the bail arm 10 is at fishing line rewinding position as at "B." Then, if the bail arm 10 is manually shifted from the fishing line rewinding position to a release position as at "A" as shown in FIG. 2(a), the bail arm cam 12 is rotated to the direction shown by an arrow "b", so that the boss 19 integral with the cam 12 abuts against the one end 17' of the kick lever 17. Therefore, the upstanding end 17" of the kick lever is pivotted about the pin 18 in the clockwise direction in FIG. 2 (from its position shown in FIG. 2(b) to the position shown in FIG. 2(a)), so that the upstanding end 17" is brought into contact with the operation cam 20 in the fishing line release position.

In the case, one end 21' of the dead-point-spring 21 which engages the bail arm cam 12 exceeds the line "a," while the other end 21" which engages the kick lever 17 is on the line "a," so that the dead point spring 21 urges the bail arm cam 12 toward the direction shown by the arrow "b" to thus maintain the bail arm 10 in its fishing line releasing position A. This urging force is proportional to the urging force to the direction opposite to the arrow "b," when the bail arm 10 is shifted from the position A to position B.

Then, if the handle (not shown) is rotated to rotate the rotor 4, the upstanding end 17' of the kick lever 17" is directly brought into abutment with the stationary operation cam 20, so that the kick lever 17 is pivoted about the pin 18 in counterclockwise direction in FIG. 2 (from the position shown in FIG. 2(a) to the position shown in FIG. 2(b)). That is, the kick lever 17 is urged toward the direction shown by an arrow "c." In this case, the one end 17' urges the boss 19 toward the clockwise direction in the drawing, so that the one end 21' of the dead-point-spring 21' also moved by the rotation of the bail arm cam 12. When the one end 21' of the dead-point-spring 21' exceeds the line "a," the dead-point-spring 21 further urges the bail arm cam 12 in clockwise direction (to the direction opposite to the arrow "b"), because of the opposite urging force of the dead-point-spring 21, so that the bail arm 10 is returned to its fishing line rewinding position B and the position is maintained by the force of the dead-point-spring 21.

Figure 3:
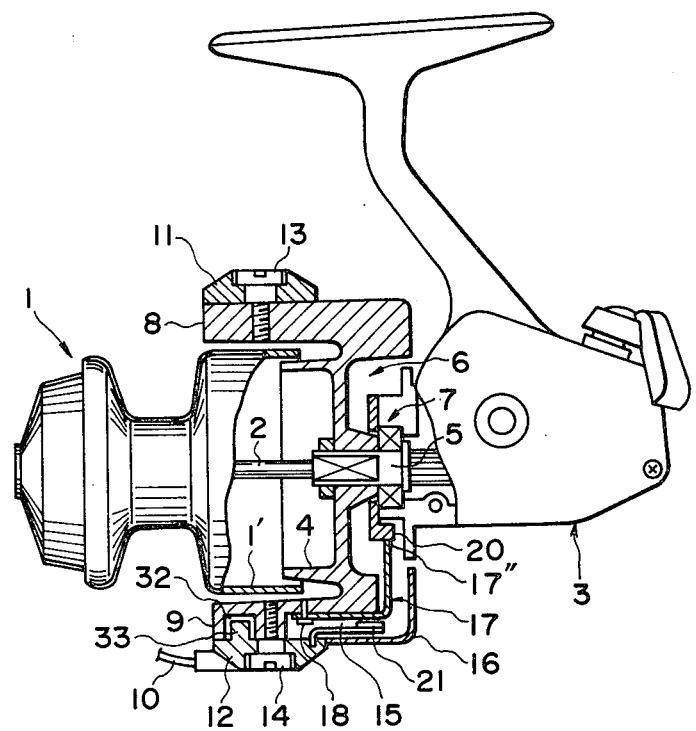
FIG. 3 is a fragmentary cross-sectional view according to a second embodiment of this invention.
Figure 4A:
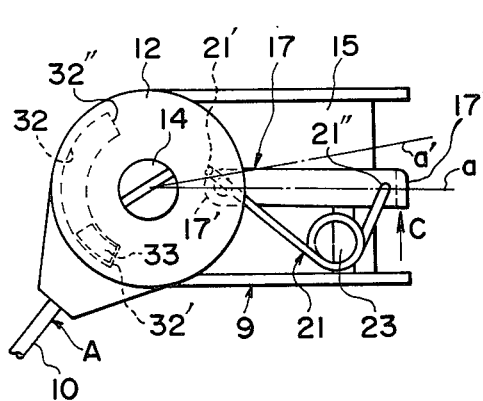
FIGS. 4(a) and 4(b) show plan views of a bail latching and releasing mechanism according to the second embodiment of this invention.
Figure 4B:
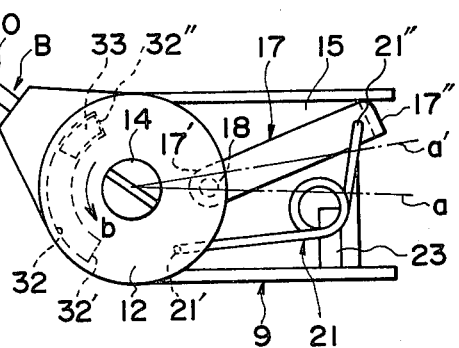
Figure 5:
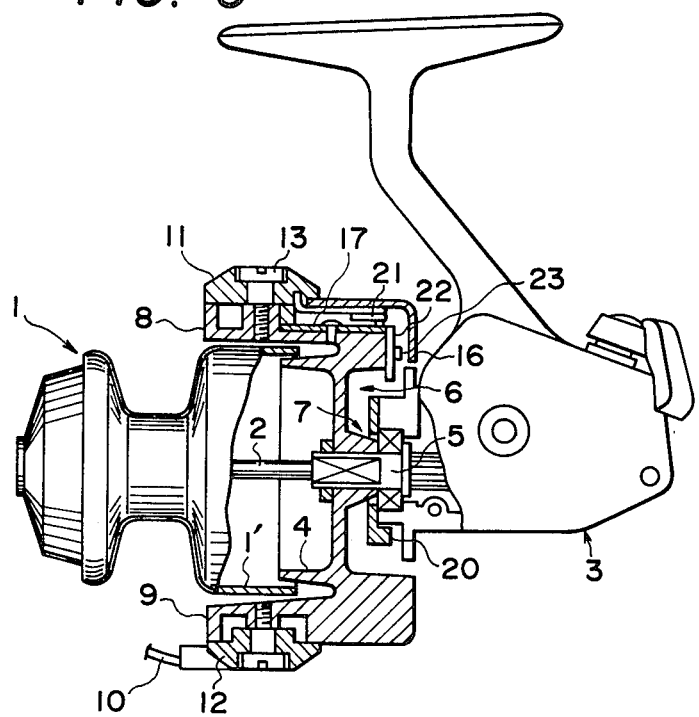
FIG. 5 is a fragmentary cross-sectional view according to a third embodiment of this invention.

A second embodiment according to the present invention is shown in FIGS. 3, 4(a) and 4(b), wherein like parts and components are designated by the same reference numerals and characters as those shown in the first embodiment. According to the second embodiment, L-shaped kick lever 17 is pivotably secured to the bottom surface of a recessed portion 15 by a pin 18 similar to the first embodiment. However, the position of the pin 18 differs from that of the first embodiment. Similarly, a dead-point-spring 21 is disposed in the recess 15. The dead-point-spring 21 has one end 21' engaged with the bail arm cam 12 and has the other end 21" engaged with the kick lever 17 at the position near the upstanding end 17" of the kick lever 17. The dead-point-spring 21 provides a shiftable dead points "a" and "a'."

One of the support housings 9 which mounts the bail arm cam 12 is formed with an arcuate guide groove 32 in sliding contact with a projection 33 formed integral with the bail arm cam 12. Because of the sliding contact between the projection 33 and the guide groove 32, the rotation of the bail arm cam 12 is restricted into a predetermined range, i.e., the rotation of the bail arm cam 12 is stopped upon abutment of the projection 33 against one end 32' of the guide groove 32 to maintain the bail arm 10 in its fishing line releasing position A, while the opposite rotation of the bail arm cam 12 is stopped upon abutment of the projection 33 against the other end 32" of the guide groove 32 to maintain the bail arm 10 in its fishing line rewinding position B.

With this structure, when the bail arm 10 is at fishing line rewinding position B, the upstanding end 17" of the kick lever 17 is positioned, whose rotation locus does not contact with the stationary operation arm 20.

Then, if the bail arm 10 is manually shifted to the fishing line release position A, the bail arm cam 12 is rotated to the direction shown by an arrow "b," so that one end 21' of the dead-point-spring 21 is moved to exceed the dead point "a," to thus urge the bail arm cam 12 in counterclockwise direction in the drawing. The counterclockwise rotation of the bail arm cam 12 is stopped when the projection 33 abuts the one end 32' of the guide groove 32 to thereby maintain the bail arm 10 in its fishing line release position A.

In this case, the upstanding end 17" of the kick lever 17 is rotated in clockwise direction about the pin 18 because of the resiliency of the dead-point-spring 21, so that the end 17" is brought into contact with the operation cam 20.

With the state, if the handle is rotated to rotate the rotor 4, the upstanding end 17" of the kick lever 17 abuts against the operation cam 20, so that the end 17" is urged toward the direction C, and is rotated in counterclockwise direction about the pin 18 in the drawing. The dead-point-spring 21 having the other end 21" connected to the kick lever is also moved together with the movement of the kick lever 17, and the position of the dead point "a" is displaced to the second position shown by "a'." If the other end 21" of the dead-point-spring 21" exceeds the dead point "a'" as shown in FIG. 4(b), the bail arm cam 12 is rotated to the direction opposite the arrow "b," because of the urging force of the dead point spring 21, to return the bail arm 10 and the rotation is stopped by the abutment between the projection 33 and the other end 32" of the guide groove 32, to thus maintain the bail arm 10 in its fishing line rewinding position.

Reference numeral 23 designates a stopper formed in the recess 15 in order to prevent pivotal movement of the kick lever toward clockwise direction in the drawing, to thus maintain the kick lever 17 at the position capable of abutting against the operation arm 20 during fishing line releasing state.

Third and fourth embodiments according to the present invention will be described hereinbelow. According to the third and fourth embodiments, a bail latching and releasing mechanism is disposed in the other support housing 8 which rotatably mounts the bail arm lever 11 and the kick lever 17 is pivotally moved by the operation arm 20 through a transmission lever 22. Other structures of the third and fourth embodiments are the same as those shown in the first and second embodiments, respectively.

The transmission lever 22 serves to change direction of force applied to the kick lever 17, upon abutment between the transmission lever 22 and the operation arm 20, because the kick lever 17 is disposed in the support housing 8, contrary to the first and second embodiments, wherein the lever is disposed in the housing 9.

Third embodiment of this invention is shown in FIG. 5 to FIG. 7(b), while the fourth embodiment is shown in FIG. 8 through FIG. 10(b).

According to the third and fourth embodiments, the transmission member 22 is pivotably secured to a rear face of the rotor 4 by a pivot pin 23 at the longitudinally center portion thereof. One end 22' of the transmission lever 22 extends into the recess 15 of the housing 8 in order to contact with the kick lever 17, while the other end 22" thereof extends into the cylindrical recess 6 in order to contact with the operation cam 20. Further, a biasing spring 24 is provided in the cylindrical recess 6. The spring 24 has one end connected to the support housing 8 and the other end connected to the transmission lever 22 to normally urges the other end 22" of the transmission lever 22 toward the position shown by FIGS. 6(b) and 9(b) capable of preventing it from being brought into contact with the operation cam 20 during fishing line rewinding operation.

Figure 6A:
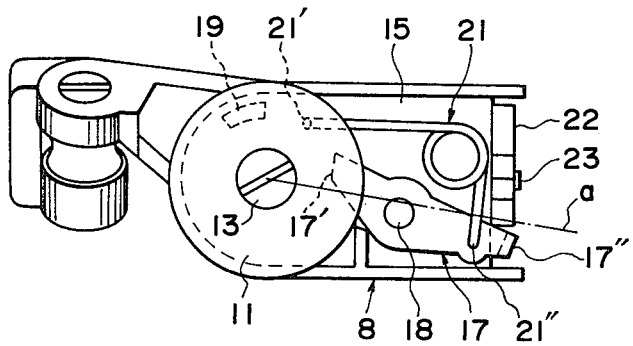
FIGS. 6(a) and 6(b) show a bail latching and releasing mechanism according to the third embodiment of this invention, wherein the bail arm is at fishing line rewinding position.
Figure 6B:
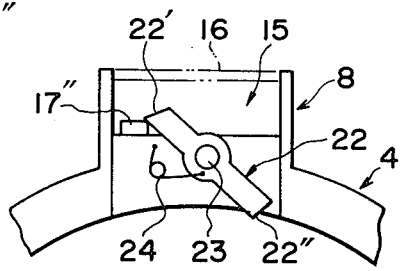
Figure 9A:
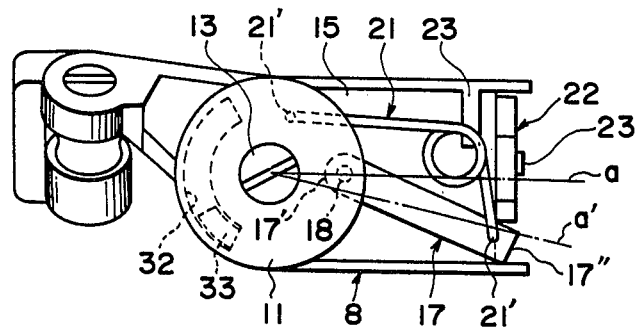
FIGS. 9(a) and 9(b) show a bail latching and releasing mechanism according to the fourth embodiment of this invention, wherein the bail arm is at fishing line rewinding position.
Figure 9B:
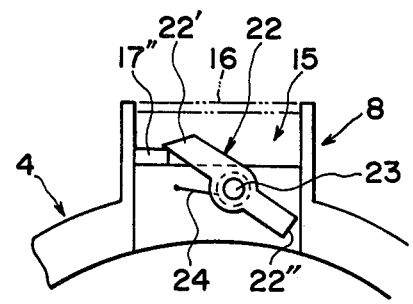
Figure 10A:
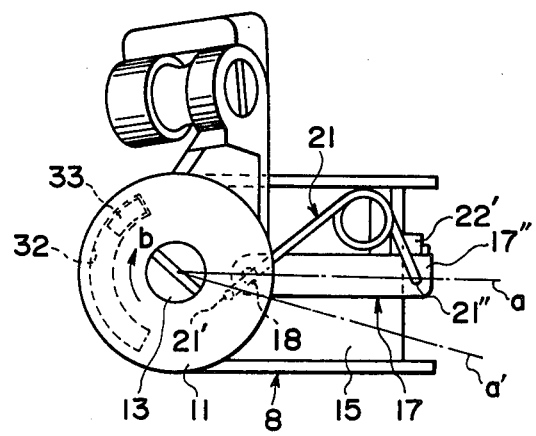
FIGS. 10(a) and 10(b) show a bail latching and releasing mechanism according to the fourth embodiment of this invention, wherein the bail arm is at fishing line releasing position.
Figure 10B:
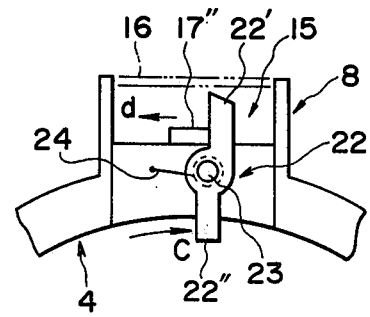

Thus, when the bail arm 10 is at fishing line rewinding position as shown in FIGS. 6(a) and 9(a), the other end 22" of the transmission lever 22 is positioned by the spring 24 so as not to abut against the operation cam 20, as shown in FIGS. 6(b) and 9(b). When the bail arm 10 is manually shifted to fishing line releasing position as shown in FIGS. 7(a) and 10(a), one end 22' of the transmission lever 22 is urged by the other end 17" of the kick lever, so that the transmission lever 22 is rotated in clockwise direction in the drawing against the biasing force of the spring 24, resulting in that the other end 22" of the transmission lever 22 is brought into abutment with the operation cam 20. Therefore, because of the rotation of the rotor 4, the operation cam 20 urges the other end 22" of transmission lever 22 toward the direction shown by an arrow "c" in order to rotate the lever 22 in counterclockwise direction in the drawing, to thereby urge the other end of the kick lever 17" toward the direction shown by an arrow "d," whereby the bail arm 10 is returned to its fishing line rewinding position.

In view of the foregoing, according to the present invention, the bail latching and releasing mechanism for the arm spool type of spinning reel is accommodated in either one of the support housings 8 or 9. Further, the bail latching and releasing mechanism according to this invention is provided by reduced numbers of mechanical parts such as only by the kick lever 17, dead-point-spring 21 and operation, cam 20, and therefore, the assembling work becomes easy, and the production cost is lowered, and a compact fishing reel is obtainable without an employment of a balance-weight which has been used to provide well-balanced reel. Moreover, the dead-point-spring 21 serves to provide bail turning force as well as to provide positioning of the kick lever and to selectively maintain the bail arm in its fishing line release or rewinding position, the any mechanical adjustment after assemblage is not required, yet providing excellent bail latching and releasing operation.

While the invention has been described in detail and with reference to specific embodiments thereof, it will be apparent to one skilled in the art that various changes and modifications can be made therein without departing from the spirit and scope thereof.

What is claimed is:

1. In an arm-spool type spinning reel including a bail arm pivotally mounted at both ends on support housings each positioned at diametrically opposite sides of a rotor for swinging movement thereacross between cocked and rewind positions, bail support members including a bail arm cam and a bail arm lever, said bail arm cam pivotably mounted on one of said support housings to support one end of said bail arm and said bail arm lever pivotably mounted on other of said support housing to support the other end of said bail arm, the improvement comprising; a bail arm latching and releasing mechanism assembled in either one of said support housings, said bail arm latching and releasing mechanism comprising:
    (a) a kick lever pivotably secured to said one of said support housings,
    (b) a dead point spring having one end connected to said kick lever and the other end connected to one of said bail support members disposed in said one of said support housings to bias said bail arm toward cocked and rewind positions, said dead point spring having dead point between bail arm cocked and rewind positions, and
    (c) an operation cam secured to a stationary portion of a reel body, said operation cam being adapted to pivot said kick lever when said bail arm is at fishing line cocked position to urge said bail arm from its cocked to rewind position.

2. The improvement of claim 1, wherein said bail arm latching and releasing mechanism is assembled in said support housing which pivotably mounts said bail arm cam, and wherein said other end of said dead point spring is connected to said bail arm cam.

3. The improvement of claim 2, wherein said bail arm cam is integrally formed with a boss adapted to abut against one end of said kick lever, and wherein said kick lever has L-shape, the other end of said kick lever being radially inwardly extended to abut against said operation cam, the abuttment between said boss and said one end of said kick lever permitting said other end of said kick lever to shift so as to abut against said operation cam at fishing line release position of said bail arm.

4. The improvement of claim 2, wherein said bail arm cam is formed with a projection adapted to slidingly engage an arcuate guide groove formed in said housing in order to restrict rotation of said bail arm cam, and wherein said dead point spring urges said kick lever toward a position capable of abutting against said operation cam at fishing line release position of said bail arm.

5. The improvement of claim 1, wherein said bail arm latching and releasing mechanism is assembled in said other support housing which pivotably mounts said bail arm lever, and wherein said other end of said dead point spring is connected to said bail arm lever.

6. The improvement of claim 5, wherein said bail arm lever is integrally formed with a boss adapted to abut against one end of said kick lever to pivot the same, the abutment between said boss and said one end of said kick lever permitting the other end of said kick lever to be urged by said operation cam at fishing line release position of said bail arm.

7. The improvement of claim 6, further comprising a transmission lever pivotably secured to said rotor, and a biasing spring, said transmission lever having one end contacted with said other end of said kick lever and having the other end contacted with said operation cam at fishing line release position of said bail arm, and said biasing spring being adapted to normally urge said transmission lever toward a position offset from said operation cam.

8. The improvement of claim 5, wherein said bail arm lever is integrally formed with a projection adapted to slidingly engage an arcuate guide groove formed in said other support housing to restrict rotation of said bail arm lever, and wherein said dead point spring urges said kick lever toward a position capable of being urged by said operation cam at fishing line release position of said bail arm.

9. The improvement of claim 8, further comprising a transmission lever pivotably secured to said rotor, and a biasing spring, said transmission lever having one end contacted with said kick lever and having the other end contacted with said operation cam at fishing line release position of said bail arm, and said biasing spring being adapted to normally urge said transmission lever toward a position offset from said operation cam.

* * * * *